United States Patent Office 3,115,747
Patented Dec. 31, 1963

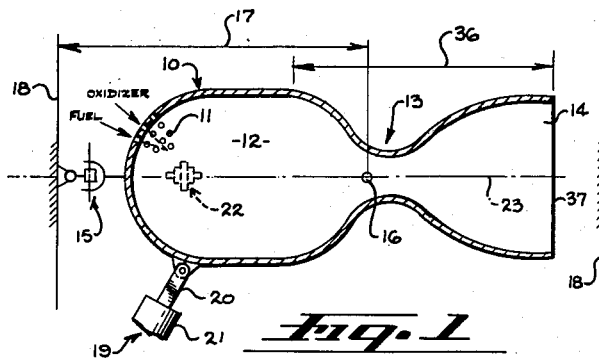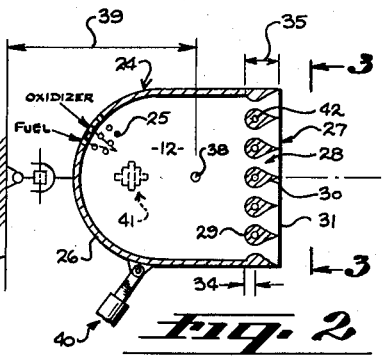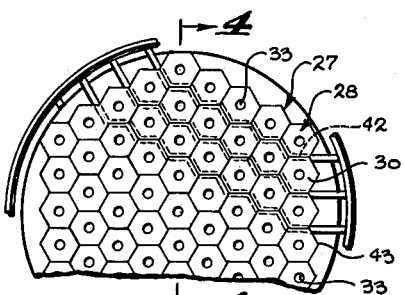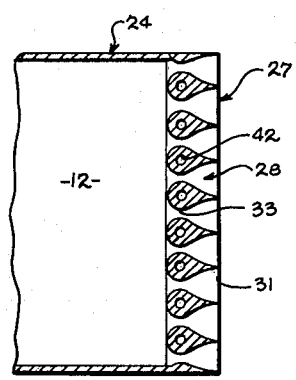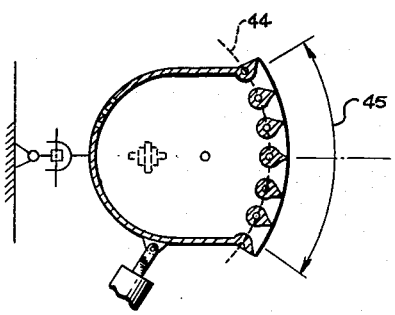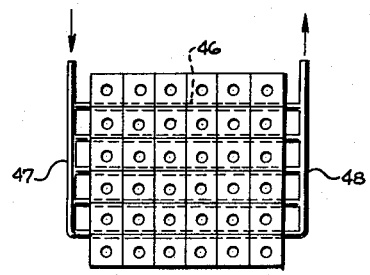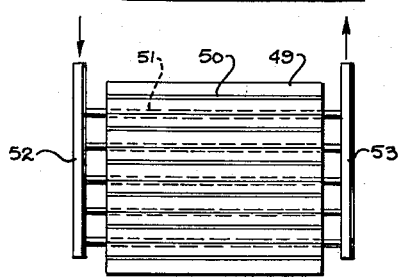

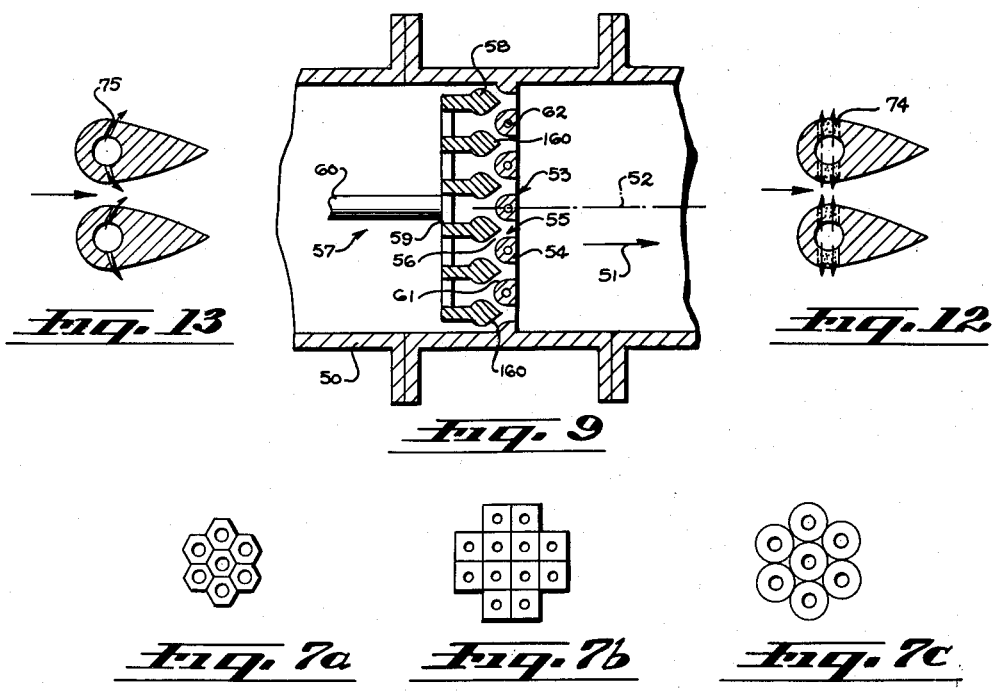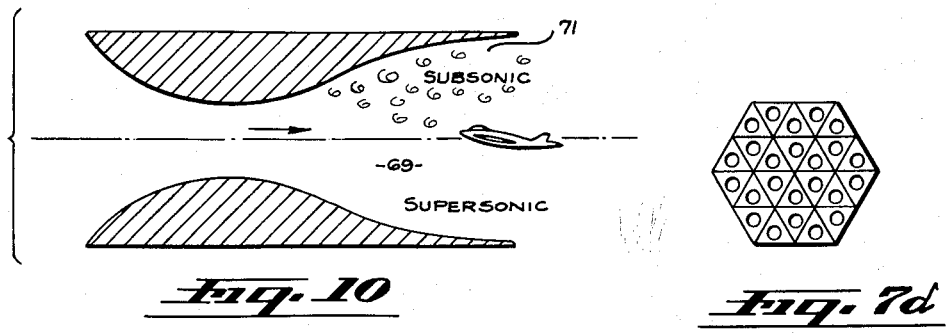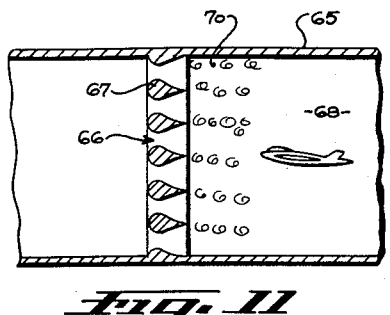

3,115,747
APPARATUS FOR CONVERTING FLUID ENERGY FROM POTENTIAL TO KINETIC
Ying-Nien Yu, Pasadena, Calif., assignor to Inca Engineering Corporation, Pasadena, Calif., a corporation of California
Filed Dec. 15, 1959, Ser. No. 859,789
6 Claims. (Cl. 60—35.6)

This invention relates generally to improvements in nozzle structures, and more particularly concerns improvements applicable to the nozzle structures of propulsion systems, flow control devices, and wind tunnels of certain types. While the invention will be discussed primarily with its application to propulsion systems, it will be understood that it finds advantageous use in flow control devices and wind tunnel apparatus, which will be briefly described.

Present day propulsion systems utilizing nozzles from which thrust is derived have certain limitations which are imposed by the design and construction of conventional nozzles. For example, a typical propulsion system incorporates a large single nozzle or a cluster of a few large nozzles characterized in that such nozzles usually develop turbulent boundary-layers at the nozzle throat regions which intensify heat transmission to the throat metal and consequent rapid destruction thereof. Other limitations include the relatively large size and weight of such conventional nozzles, which requires rather heavy and bulky gimballing apparatus to pivot the nozzle and the combustion chamber for guidance purposes.

The present invention, as applied to the field of jet propulsion systems, facilitates a major advance in the design and construction of such systems in that the problems or limitations associated with conventional propulsion nozzles as discussed above, are overcome. The major objects of the invention as applied to propulsion systems include the provision of a novel apparatus for converting fluid potential energy to fluid kinetic energy, wherein a large number of typically convergent-divergent nozzles, called multinozzles, have over all length that is substantially less than the length of a reference thrust nozzle, for the same thrust output and total exit areas. Also, in this field the invention achieves a substantial reduction in the nozzle heat transfer coefficient with corresponding reduction in total cooling load, and a resulting decrease in weight and increase in strength of the nozzle wall structures. The reduction of heat transfer coefficient is due to the short inlet lengths of the multinozzles at the surface of which laminar-boundary layers exist. Furthermore, sound and noise levels of jet exhausts are significantly reduced and the invention achieves a decrease in combustion and flow instability as a result. Very importantly, the decrease in nozzle length and weight, as well as the reduction in nozzle heat transfer coefficient, contribute to improvements in design, construction and performance of the gimballing mechanism, as for example permitting reduction of weight thereof, which factors ultimately permit a significant increase in the pay loads of missiles, booster rockets for satellites, and space vehicles. Finally, the reduction in sound and noise levels of jet exhausts and the decrease in combustion and flow instability permitted by the invention provide for more accurate thrust measurement.

As applied to the field of flow control devices, the invention has as its object the provision of flow uniformity downstream of the valve and low pressure drop across the valve as compared to a comparable single nozzle valve. Where high energy fluids are being subjected to control, the invention in this field also has many of the advantages referred to in application of the invention to propulsion systems.

Finally, the invention finds advantageous use and application to the field of high energy wind tunnels used for research purposes. Such tunnels are enabled to have reduced nozzle length, low convective heat transfer coefficients along the nozzle walls, and quick interchangeability of nozzle sections is facilitated. In addition, the useful test region of the tunnel has increased size due to the thin boundary-layer growth at the nozzle exit, and model starting and stopping loads are reduced because of highly localized asymmetric flow, which results in reduction of jet mixing length and corresponding jet whipping forces. Finally, the running time of blow-down tunnels is increased due to volumetric reduction of the nozzle void.

These and other objects of the invention, as well as the details of an illustrative embodiment, will be more fully understood from the following detailed description of the drawings, in which:

FIG. 1 is a showing of a conventional liquid rocket combustion chamber incorporating a single nozzle, and shown in sectional elevation;

FIG. 2 is a sectional elevation of a liquid rocket propulsion chamber which is constructed in accordance with the principles of the invention;

FIG. 3 is an enlarged end view looking upstream toward the exit regions of nozzle openings of the invention;

FIG. 4 is a section taken on line 4—4 of FIG. 3;

FIG. 5 is a view similar to FIG. 2 showing another form of the invention;

FIG. 6 is a view similar to FIG. 3 showing a different arrangement of the nozzle exit openings;

FIGS. 7(a) through 7(d) show other arrangements of nozzle exit openings;

FIG. 8 illustrates a "two-dimensional" arrangement of the nozzle exit openings in accordance with the invention;

FIG. 9 is an elevation taken in section through a flow control device incorporating the invention;

FIG. 10 is an elevation taken in section through a conventional large single nozzle in a wind tunnel;

FIG. 11 is an elevation taken in section through an improved wind tunnel incorporating the invention;

FIG. 12 is an enlarged longitudinal sectional elevation through structure forming a single multinozzle that is transpiration cooled; and FIG. 13 is an enlarged longitudinal sectional elevation through structure forming a single multinozzle that is film cooled.

Referring first to FIG. 1, there is shown generally at 10 a combustion chamber into which liquid fuel and oxidizer are injected, typically through orifices 11 and into the combustion portion 12 of the conventional chamber 10. The chamber has a single nozzle generally indicated at 13 through which the high pressure fluid in the combustion chamber flows rearwardly to the enlarged exit end portion 14 of the nozzle in order that the potential energy of the fluid may be converted to kinetic energy for development of thrust. As is common practice, the chamber is swiveled or gimballed to change the direction of thrust of the rocket motor, one illustrative means for swiveling the chamber being shown by the pivot 15 indicated generally at the forward end of the chamber. The center of mass of the chamber is indicated at 16 and the gimballing moment arm is shown by the dimension 17 between the center of mass 16 and the support 18 for the pivoted chamber. A rather heavy duty gimballing apparatus is shown generally at 19 as including an actuator rod 20 and cylinder 21, the former being connected to the rocket chamber 10. Another heavy duty gimballing mechanism is shown at 22 in broken lines, it being 90 degrees offset from the gimballing mechanism 19 about the longitudinal or forward and rearward axis 23 of the chamber.

The improved apparatus for converting fluid potential energy to fluid kinetic energy as applied to propulsion systems is shown in one form in FIG. 2. The latter comprises a chamber 24 for containing the high pressure, high energy fluid, as for example burning gases at temperatures between 2,000 and 8,000 degrees F. and pressures between 100 to 1000 p.s.i. The orifices through which the fuel and oxidizer are typically injected into the combustion zone 12 are shown at 25, these normally being distributed around the curved forward end 26 of the chamber 24. Chamber 24 includes a head structure generally indicated at 27 which extends laterally at the downstream ends of the chamber, the head structure containing a large number of laterally spaced thrust nozzle openings 28 having rearwardly convergent inlets 29 in communication with the downstream interior of the chamber for receiving the pressure fluid at the forward side of the head structure. These thrust nozzle openings are shown as venturi shaped in longitudinal axial cross section, with rearwardly divergent outlets 30 terminating in an exit plane 31, the outlets communicating with the rearward exterior of the chamber for discharging the expanding pressure fluid at the rearward side of the head structure. The latter is preferably, but not necessarily, made of an integral block of material as better shown in FIGS. 3 and 4. For solid propellant rocket engines, the combustion chambers in FIGS. 1 and 2 are replaced by typical solid engine components including solid propellant. FIGS. 2 and 4 also show the rearwardly diverging outlets to have boundaries which are concavely disposed with respect to the longitudinal centerlines of the nozzle outlets.

Generally speaking, there are a large number of thrust nozzle openings 28 provided, these being referred to herein as "multinozzles." Sufficient of the latter are present that the pressure fluid has approximately laminar boundary layers at the nozzle walls forming throat regions indicated at 33 in FIG. 4. This condition is made possible by the very considerable shortening of the inlet lengths of the nozzle openings indicated by the dimension 34 in FIG. 2, as compared to the inlet length of the venturi shaped single nozzle 13 in FIG. 1. As a result, the head structure 27 forming the nozzle openings, while it does receive heat from the hot gases flowing through the openings, is effectively insulated from the gases as compared with heat transfer from the gases flowing through the single nozzle 13 in FIG. 1 to the wall of chamber 10.

Furthermore, the over all length of the nozzle openings indicated by the dimension 35 in FIG. 2 is much less than the length of the single nozzle indicated at 36 in FIG. 1. The exit area of the FIG. 1 nozzle is equal to the combined equal exit areas of the multinozzle openings 28 in the plane 31 of FIG. 2, and therefore, the thrust output of the FIG. 1 and FIG. 2 propulsion devices is the same. The exit area of the FIG. 1 nozzle is taken in the plane indicated at 37. Accordingly, as is clear from these and the other drawings, the nozzle openings have inlets which are formed by forwardly convexly protuberant portions of the head structure 27, and the rearwardly projected areas of the outlets to openings 28 are cumulatively substantially equal to the rearwardly projected overall area of that portion of head structure 27 that contains the openings 28. FIG. 4 furthermore shows the rearward extent of the head structure forming the divergent outlets of openings 28 to have concave side walls.

As a result of the very considerable shortening of the over all length of the multinozzles as compared with the length of an equal performance single nozzle, the center of mass of the multinozzle chamber indicated at 38 in FIG. 2 is considerably closer to the support 18, so that the gimballing moment arm 39 is considerably shorter than the gimballing moment arm 17 in FIG. 1. Therefore the gimballing apparatus shown at 40 and 41 in FIG. 2 may have considerably less weight than apparatus 21 and 22 in FIG. 1, and the weight of the propulsion chamber itself in FIG. 2 is considerably less than the weight of chamber 10 in FIG. 1. This then permits increased pay load in the rocket or missile to be driven by the propulsion apparatus of FIG. 2 as compared with the apparatus of FIG. 1.

Another advantage of the multinozzle propulsion chamber, characterized by the existence of a much lower heat transfer coefficient as respects heat transfer from the gases in the nozzle openings to the head structure, consists in the use of heat sink cooling techniques. For example, cooling passages 42 are shown running through the head structure in FIGS. 3 and 4 so that a coolant passing through these passages may withdraw heat transferred to the head structure from the gases flowing through the nozzle openings 28. These nozzle openings are arranged in FIG. 3 as an hexagonal honeycomb, the rearward terminal edges 43 of the head structure lying in the plane 31 shown in FIG. 4.

Referring to FIG. 5, the venturi shaped nozzle opening throats are shown located in a curved plane 44 indicated in broken lines, that plane being forwardly concave. It may for example comprise a segment of a spherical envelope or of a paraboloidal envelope, and as a result the gases escaping rearwardly from the combustion chamber and through the nozzle openings are discharged rearwardly and divergently within the confines of a cone as indicated by the conical angle 45.

FIG. 6 shows the multinozzles arranged in a rectangular pattern with the coolant passages 46 through the head structure being inter-connected by inlet and outlet headers 47 and 48 at opposite sides of the chamber.

FIGS. 7(a) through 7(d) show other alternate configurations for the multinozzle openings as viewed at the rear of the combustion chamber. FIG. 8 illustrates nozzle openings 49 having throats 50, and all of which are linearly elongated in substantially parallel relation and normal to the direction of fluid flow therethrough. Thus, the fluid would escape from the nozzle openings 49 in a direction upwardly and normal to the plane of FIG. 8. Coolant passages 51 through the head structure of FIG. 8 are shown interconnected at opposite sides of the head structure by inlet and outlet coolant liquid headers 52 and 53. For solid propellant rocket engines, cooling is generally not required, so that cooling passages as shown in FIGS. 3 through 6 may be omitted.

Referring now in greater detail to the principles of the invention as applied to a propulsion system, the length of a multinozzle in comparison with a single nozzle is inversely proportional to the square root of the number of nozzles in the multinozzle, i.e., $$l = \frac{L}{\sqrt{N}} \quad (1)$$

where $l$ and $L$ are the lengths of multinozzle and single nozzle, respectively, and N is the number of multinozzle throats. This assumes the same total exit area for the single nozzle and for the multinozzles. Whereas the boundary-layer development in the throat regions of a single nozzle is turbulent due to considerable nozzle contracting length, the boundary-layer development in the throat region of a multinozzle can be made laminar by considerable shortening of inlet length. It is well-known that the heat-transfer coefficient of forced convection in laminar boundary-layer is an order of magnitude less than that in a turbulent boundary-layer. This can be demonstrated by comparing the average heat-transfer formulas for flat plate flow with zero pressure gradient. The Nusselt numbers for the laminar and turbulent boundary-layers at a distance $x$ from the leading edge are given by the following approximate equations:

$$[Nu_x]_L \cong \frac{h_L x}{K} \cong 0.33 Pr^{1/3} Re_x^{1/2} \quad (2)$$

and $$[Nu_x]_T \cong \frac{h_T x}{K} \cong 0.037 Pr^{1/3} Re_x^{4/5} \quad (3)$$

where $h_L$ and $H_T$ are the heat transfer film coefficients of the laminar and turbulent boundary-layers; K is the heat conductivity; $Pr$ is the Prandtl number; and $Re_x$ is the Reynolds number based on the length $x$.

For estimating purposes, let us consider that $2 \times 10^6$ is the critical Reynolds number at which the ratio of laminar and turbulent heat-transfer coefficients can be calculated, this selection being conservative. Then, by substituting this value into Equations 2 and 3

$$\frac{h_L}{h_T} \cong 0.11 \tag{4}$$

To determine N of a multinozzle with certain given flow conditions, and for a laminar boundary-layer at the throats, the method is as follows:

Assume a rocket nozzle with the flow parameters $P_c$, $A_T$ and $c^*$ given. $P_c$ is the chamber pressure; $A_T$ is the sonic throat area; and $c^*$ is the characteristic velocity. Then, the mass flow rate is expressed as $$\dot{w} = \frac{P_c A_T g}{c^*} = \frac{P_c N A_t g}{c^*} \tag{5}$$

where $A_T = A_t N$, and $A_t$ is the sonic throat areas of one of the small nozzles in the multinozzle.

The Reynolds number based on the entrance length $l_i$ at the throat is $$Re = \frac{\dot{w} l_i}{N A_t \mu} = \frac{P_c g l_i}{c^* \mu} \tag{6}$$

where $\mu$ is the absolute viscosity. Let $l_i$ be equal to twice the diameter of the throat; i.e., $$l_i = 2D_t = 4\sqrt{\frac{A_t}{\pi}}$$

Hence $$Re = \frac{P_c 4g}{c^* \mu} \sqrt{\frac{A_t}{\pi}} \tag{7}$$

Assume the critical Reynolds number for transition to a turbulent boundary-layer along the nozzle wall is $1 \times 10^6$. In comparison with critical Reynolds number for flat plate flow with zero pressure gradient, this assumption is fairly conservative because of the presence of favorable pressure gradient along the nozzle wall. It is now possible to determine N. First $$A_t = \frac{\pi}{16}\left[\frac{Re_{CRI} c^* \mu}{P_c g}\right]^2$$

or $$A_t = \frac{\pi \times 10^{12}}{16}\left[\frac{c^* \mu}{P_c g}\right]^2 \tag{8}$$

Therefore, the minimum N for laminar flow at the multinozzle throats is:

$$N = \frac{A_t}{\frac{\pi \times 10^{12}}{16}\left[\frac{c^* \mu}{P_c g}\right]^2} \tag{9}$$

As an illustrative example, consider a rocket engine with the following conditions:

$P_c = 600$ p.s.i.
$A_T = 1$ ft.$^2$
$C^* = 5000$ ft./sec.
$\mu = 2 \times 10^{-6}$ —sec./ft.$^2$ Substituting these values into (8), $A_t \cong 0.38$ inch$^2$ or the diameter of the multinozzle throat is $0.7''$. Also, from (9) $N \cong 385$.

With regard to the cooling requirement for multinozzles, the increase in the number of nozzles will not result in an increase in wetted surface area. Therefore, with reduction of the heat-transfer coefficient, the cooling load will be reduced proportionally. Furthermore in the case of a multinozzle the resulting substantially reduced wall temperature will permit higher allowable working stress in the wall structural materials. Therefore, the nozzle section can be made stronger and lighter, and the choice of materials for the structure is relatively easy.

The low heat transfer coefficient also should permit use of sweat-cooling and film-cooling techniques which are difficult to accomplish in the existing chemical rocket nozzles today. Thus, a sweat cooled nozzle is shown in FIG. 12, and as film cooled nozzle in FIG. 13. The FIG. 12 structure is porous at 74 to permit "sweating" of coolant to the nozzle wall surface. In FIG. 13, small ports 75 allow escape of coolant to the nozzle wall surface.

Referring now to FIG. 9, a flow conduit is shown at 50 with the direction of flow therethrough being illustrated at 51. Extending transversely across the flow conduit and in a plane perpendicular to the axis 52 thereof is the head structure generally indicated at 53. The latter includes a number of transversely elongated and parallel grid members 54 forming nozzle openings 55 therebetween. As illustrated, the nozzle openings have rearwardly convergent inlets 56.

A flow restrictor assembly is shown at 57 forwardly upstream of the nozzle openings, the restrictor including a transverse series of valves 58 mounted by a cross plate 59 which is movable forwardly and rearwardly by an actuator 60. The valves have rearwardly tapering end portions 160 which are movable into the nozzle inlets 56 to seat against the rearwardly convergent seat surfaces 61 of the grid members 54, thereby completely stopping the flow through the head structure 53. Furthermore, flow may be restricted to any desired degree by forward and rearward movement of the restrictor assembly 57. Such a valve incorporating variably restricted multinozzle openings 55, is particularly useful in handling extremely hot fluids, since the heat transfer to the seat surfaces 61 of the grid members 54 can be minimized by adjustment of the inlet lengths of the nozzle openings 55 so as to provide for laminar boundary-layer development, as explained above. The cooling passages through the grid members 54 are indicated at 62. Finally, the multinozzle openings 55 can be made either "two dimensional" as shown, or three dimensional, depending on the cooling requirements, two dimensional design being characterized in that the grid members 54 extend transversely across the conduit 50 and in parallel relation as indicated in FIG. 8. On the other hand, three dimensional design of the multinozzles would be similar to that illustrated in FIGS. 3 and 7.

Advantages of the multinozzle control valve construction shown in FIG. 9 include increased flow uniformity downstream of the valve, and decreased pressure drop across the valve as compared with a valve having a single opening through which all of the flow passes and which is subject to closing by a single large stopper.

FIG. 11 shows the application of multinozzles to a wind tunnel chamber 65 the multinozzle openings 66 being formed in the head structure 67. The design and construction of these multinozzles is essentially the same as discussed in connection with FIGS. 3, 6, 7 and 8. This application of multinozzles is in replacement of a single nozzle such as is shown in FIG. 10, as used in supersonic, hypersonic, hypervelocity and rarefied-gas wind tunnels. Other uses for multinozzles are in the so-called "plasma-jet" and "shock" tunnels.

The advantages of multinozzles as used in high energy research tunnels include shortening of nozzle length, low convective heat transfer coefficients along the nozzle walls, quick interchangeability of nozzle sections or head structures and size increase of the useful test region shown at 68 in FIG. 11, and 69 in FIG. 10, resulting from the thin boundary-layer growth at the multinozzle exits. In this connection, FIG. 10 shows the development of regions of subsonic and supersonic flow at the exit end of a single nozzle wind tunnel of conventional design. On the other hand, FIG. 11 shows the discharge distribution of asymmetric flow developed when multinozzles are used, lengths of the subsonic flow regions 70 in FIG. 11 being much less than the lengths of the subsonic flow region shown at 71 in FIG. 10.

The localized flow region shown in FIG. 11 contributes to reduction in test model starting and stopping loads. Another advantage in the use of multinozzles is found in increased running time of blowdown tunnels, due to a reduction of the nozzle volume, by a factor where N equals the total number of multinozzles.

I claim:
1. Improved apparatus for converting fluid potential energy to fluid kinetic energy, comprising a chamber for containing pressure fluid flowing generally longitudinally rearwardly, said chamber including head structure extending laterally at the downstream end of the chamber interior, said head structure containing a plurality of laterally spaced venturi shaped nozzle openings having rearwardly convergent inlets in communication with the downstream interior of said chamber for receiving said fluid at the forward side of said head structure and having rearwardly divergent outlets in communication with the rearward exterior of said chamber for expanding and discharging said fluid at the rearward side of said head structure, said inlets being formed by forwardly convexly protuberant portions of said head structure, and the rearwardly projected areas of said outlets being cumulatively substantially equal to the rearwardly projected overall area of that portion of the head structure containing said openings, said rearwardly divergent outlets having boundaries which are concavely disposed with respect to the longitudinal centerlines of the nozzle outlets; the overall length of each nozzle opening being substantially equal to the value of the expression:

$$\frac{L}{\sqrt{N}}$$

where, $L$ = the overall length of a single reference nozzle opening the outlet area of which is equal to the combined outlet areas of said plural nozzle openings and the thrust output of which is the same as the thrust output of said plural nozzle openings, and $N$ = the total number of said nozzle openings sufficient that approximately laminar boundary-layer conditions of the pressure fluid exist at the nozzle opening throat regions.

2. The invention as defined in claim 1 in which said head structure contains coolant passages extending transversely completely across said head structure and between said nozzle openings and including means for supplying coolant to said passages.

3. The invention as defined in claim 1 in which said head structure comprises a single block of rigid material containing all of said nozzle openings which are immovable relative to one another.

4. The invention as defined in claim 1 in which said chamber contains rocket propellant to produce said pressure fluid at elevated temperature.

5. The invention as defined in claim 1 in which said outlets have rearward terminal boundaries that are circular and in closely packed approximately abutting relationship.

6. The invention as defined in claim 1 in which said outlets have rearward terminal boundaries that are polygonal and in closely packed approximately abutting relationship.

References Cited in the file of this patent

UNITED STATES PATENTS

| | | |
|---|---|---|
| 2,744,380 | McMillan et al. | May 8, 1956 |
| 2,760,371 | Borden | Aug. 28, 1956 |
| 2,967,393 | Von Braun | Jan. 10, 1961 |
| 2,973,921 | Price | Mar. 7, 1961 |
| 3,016,697 | Sternberg et al. | Jan. 16, 1962 |
| 3,038,305 | Price | June 12, 1962 |

FOREIGN PATENTS

| | | |
|---|---|---|
| 1,066,499 | France | Jan. 20, 1954 |
| 792,831 | Great Britain | Apr. 2, 1958 |
| 399,743 | Italy | Nov. 13, 1942 |

OTHER REFERENCES

Wind Tunnel Technique by Pankhurst and Holder, 1952, page 110 and Plate I, page 158 relied on.

Space/Aeronautics, October 1958, pages 30, 31 relied on.